United States Patent
Lehfeldt

[11] 3,814,911
[45] June 4, 1974

[54] METHOD AND APPARATUS FOR INTERCEPTING A RADIO DEFINED COURSE

[75] Inventor: James J. Lehfeldt, Olathe, Kans.
[73] Assignee: King Radio Corporation, Olathe, Kans.
[22] Filed: Dec. 26, 1972
[21] Appl. No.: 318,105

[52] U.S. Cl. ...... 235/150.26, 235/150.27, 244/77 B, 343/112 C
[51] Int. Cl. .............................................. G06g 7/78
[58] Field of Search ....... 235/150.2, 150.22, 150.26, 235/150.27; 244/77 B, 77 C, 77 E; 340/27 R, 27 NA; 343/107, 112 C, 112 D

[56] References Cited
UNITED STATES PATENTS

| | | | |
|---|---|---|---|
| 3,099,077 | 7/1963 | Kittrell | 244/77 B X |
| 3,118,059 | 1/1964 | Vago | 235/150.26 |
| 3,355,126 | 11/1967 | Oppedahl | 244/77 C |
| 3,436,531 | 4/1969 | Throckmorton | 235/150.27 X |
| 3,635,428 | 1/1972 | Nelson et al. | 244/77 A |

*Primary Examiner*—Malcolm A. Morrison
*Assistant Examiner*—Jerry Smith
*Attorney, Agent, or Firm*—Lowe, Kokjer, Kircher

[57] ABSTRACT

A method and apparatus for computing a maneuver initiating logic signal including suitable circuitry and steps to produce a crosstrack rate signal is modified by a course datum variable and a conversion factor which will include a constant maximum bank angle. Further, this electrical signal is modified by the actual variable velocity of the aircraft and a comparing means is provided to compare a final velocity modified signal with a signal corresponding to crosstrack distance. When zero crossings are detected, the resultant logic signal indicates that the maneuver bank turn should be initiated for proper intercept and a capture of a radio course.

10 Claims, 6 Drawing Figures

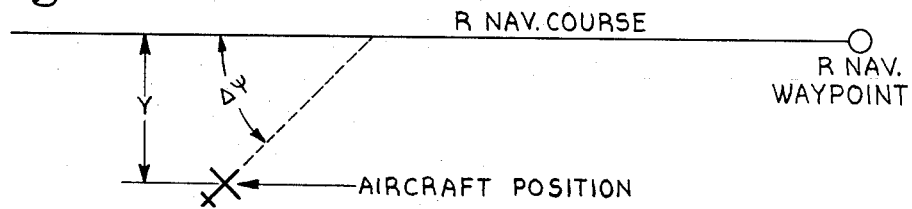
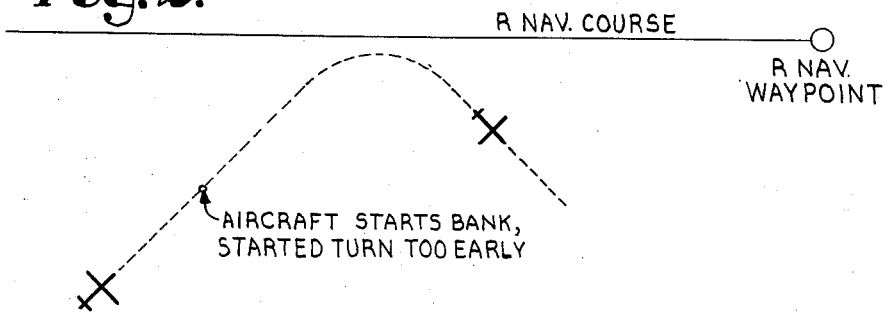
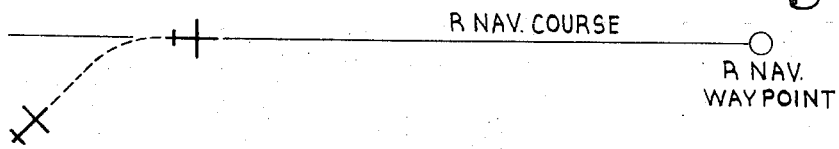
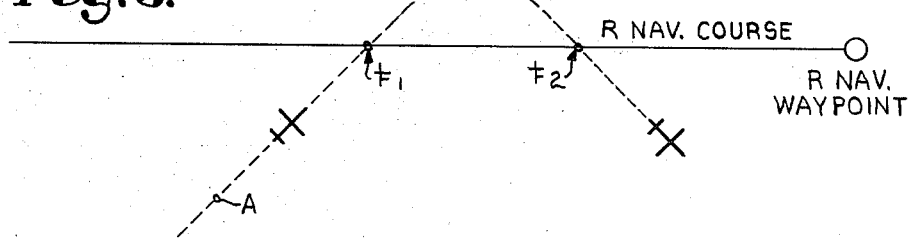
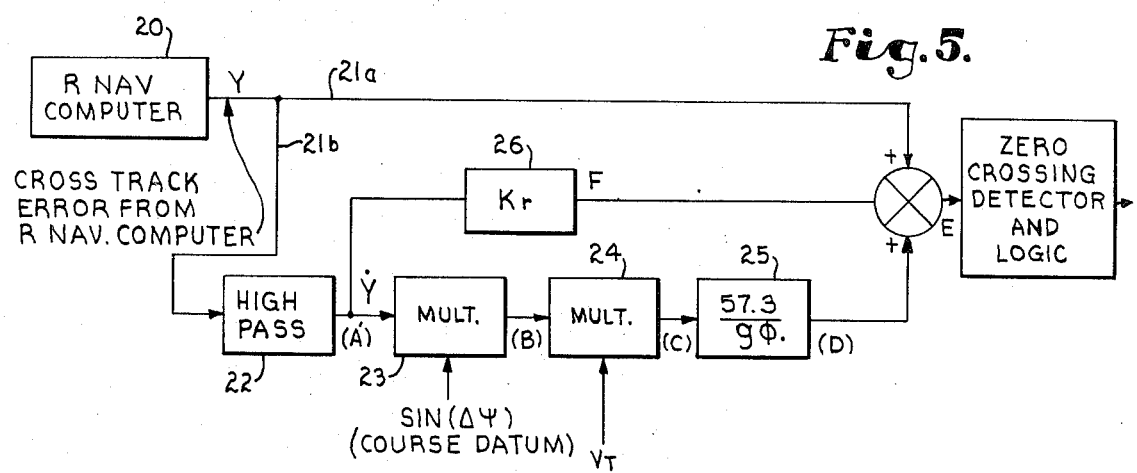

METHOD AND APPARATUS FOR INTERCEPTING A RADIO DEFINED COURSE

BACKGROUND AND BRIEF DESCRIPTION OF THE INVENTION

The subject invention relates to the method and apparatus for capturing lateral radio beams and has particular utility with flight directors and autopilots.

The most pertinent prior art known to applicant is disclosed in the patent to Oppedahl U.S. Pat. No. 3,355,126 which issued Nov. 28, 1967. This patent relates to a radio capture circuit for aircraft guidance and details the various factors that will enable a control system to "capture" a radio defined course in a more positive manner. These parameters include the distance from the radio station, aircraft velocity, and the angle at which the aircraft is taking a cut toward the selected radio course.

The problem generally associated with lateral beam capture is one of getting an aircraft from a point in space to another point in space. This includes the causing of the aircraft to be properly oriented to follow a given preset VOR or RNAV radio defined course. Accordingly it is necessary that the aircraft fly to a point and then that it executes a turn, properly orients itself and proceeds to fly down said radio defined course. One of the difficulties with the known prior art lateral beam capture systems resides in the inability to capture the desired beam or radio course quickly enough thereby rendering such a system very ineffective at or near the VOR station or waypoint.

The subject method and apparatus permits an aircraft to fly at a sharp intersect angle to the radio course and to also fly near the VOR station or RNAV waypoint prior to executing the appropriate bank angle command. As a result, the subject invention will permit the plane to execute a maximum bank angle command and to turn on to the radio course with a minimum radius and in a minimum time and distance.

Characteristic prior art capture circuits were designed to approach a radio course asymptotically so that the course cut would be a function of the radio deviation. As the radio deviation would decrease, the course cut (or intercept angle between the aircraft's heading and the radio course) would likewise decrease as a function of the radio error.

As suggested, the subject invention relates to a method and apparauts of computing a logic signal that can be used in a flight director or an autopilot to initiate the required aircraft maneuver for optimal lateral radio beam capture. The method and apparatus includes a unique step and device for utilizing an aircraft's variable velocity in order to compute the exact proper point to initiate the turn command. As a result, the method and apparatus enables an aircraft to intercept or capture a lateral radio beam and to do so in minimum time using a constant maximum banking. The varying air speed component actually causes the beam capture point to be varied depending upon the actual speed of the aircraft. Since air speed in commercial and business jets can vary between 550 miles per hour down to an approach speed of 150 miles per hour, the capture point could be accordingly varied by a factor of 3 to 1 and a pilot travelling at 200 miles an hour would not have the same ability to capture the lateral beam were he to be flying at a higher cruising speed of close to 400 miles per hour. As a result, the subject invention will alter the capture point so that the pilot will not overshoot or arrive at the capture point too late due to a miscalculation in aircraft velocity.

One of the primary objects of the invention is to provide a unique method and apparatus for enabling an aircraft to make a lateral beam capture in the minimum amount of time.

A further object of the invention is to provide a method and apparatus of the character described in which the capturing of the lateral beam by the aircraft is smooth and regular in that a single bank angle command is all that is required during the total maneuver.

Another object of the invention is to provide a unique lateral beam capture circuit which has particular utility with flight directors. It is a feature of the invention that the pilot has only to roll out to a constant bank angle and to hold said bank angle until the flight director command bars inform the pilot to return the aircraft to the zero angle.

Anothe object of the invention is to provide a lateral beam capture circuit which enables an aircraft to follow the maneuver commands in a more simplified and easier fashion while at the same time reducing the time heretofore required to achieve beam center. It is a feature of the invention that the prior art asymptotic approach systems often call for a complicated and sometimes violent maneuver command in order to eventually approach a beam center condition. These disadvantages in both time and maneuverability have been substantially eliminated by the subject invention.

A further object of the invention is to provide a 8nique method and apparatus for permitting lateral beam capture thereby enabling air traffic controllers and pilots to cooperate in an aircraft flying vectors or headings at preselected altitudes for longer durations.

Another significant object of the invention is to provide a unique method and apparatus for capturing lateral radio course beams by avionics equipment which utilizes the actual speed or velocity of the aircraft in determining the beam intersect point.

A further object of the invention is to provide a unique lateral beam capture system which permits cpature close to the actual VOR station or RNAV waypoint. It is a feature of the object that the air traffic controller may have control of the aircraft and not release the pilot to permit him to continue and make beam capture until the pilot is within two to three miles of the station or waypoint. This is to be contrasted with prior art capture systems which utilize an asymptotic approach which could result in a significant amount of overshoot if a large radio deviation signal was not provided at the start of the capture sequence.

A still further object of the invention is to provide a unique lateral beam capture system which provides the necessary signal information to an associated autopilot to insure that the aircraft is banked at a maximum constant bank angle during the entire capture maneuver and therefore achieves a minimum turn radius for the maneuver. It is a feature of this object that large course cut angles including a 90° cut or less may be made whereby prior art methods would require smaller intercept angles to make a good VOR or ILS capture.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a plot detailing the RNAV waypoint, RNAV course, aircraft position, course datum heading and RNAV cross track distance or the distance that the aircraft is away from the desired course;

FIG. 2 is a plot showing the flight pattern of an aircraft that has begun a bank maneuver too soon for intercept and lateral beam capture;

FIG. 3 is a plot showing the effect of waiting too long to begin an aircraft bank maneuver and overshooting the lateral beam or RNAV course at two locations;

FIG. 4 is a plot showing the desired flight profile and intercept condition for an aircraft with respect to a radio defined course;

FIG. 5 is a block circuit diagram showing the unique circuit for initiating the proper aircraft maneuver to insure optimum lateral beam capture, said circuit including the utilization of the actual aircraft speed.

Figure 6:
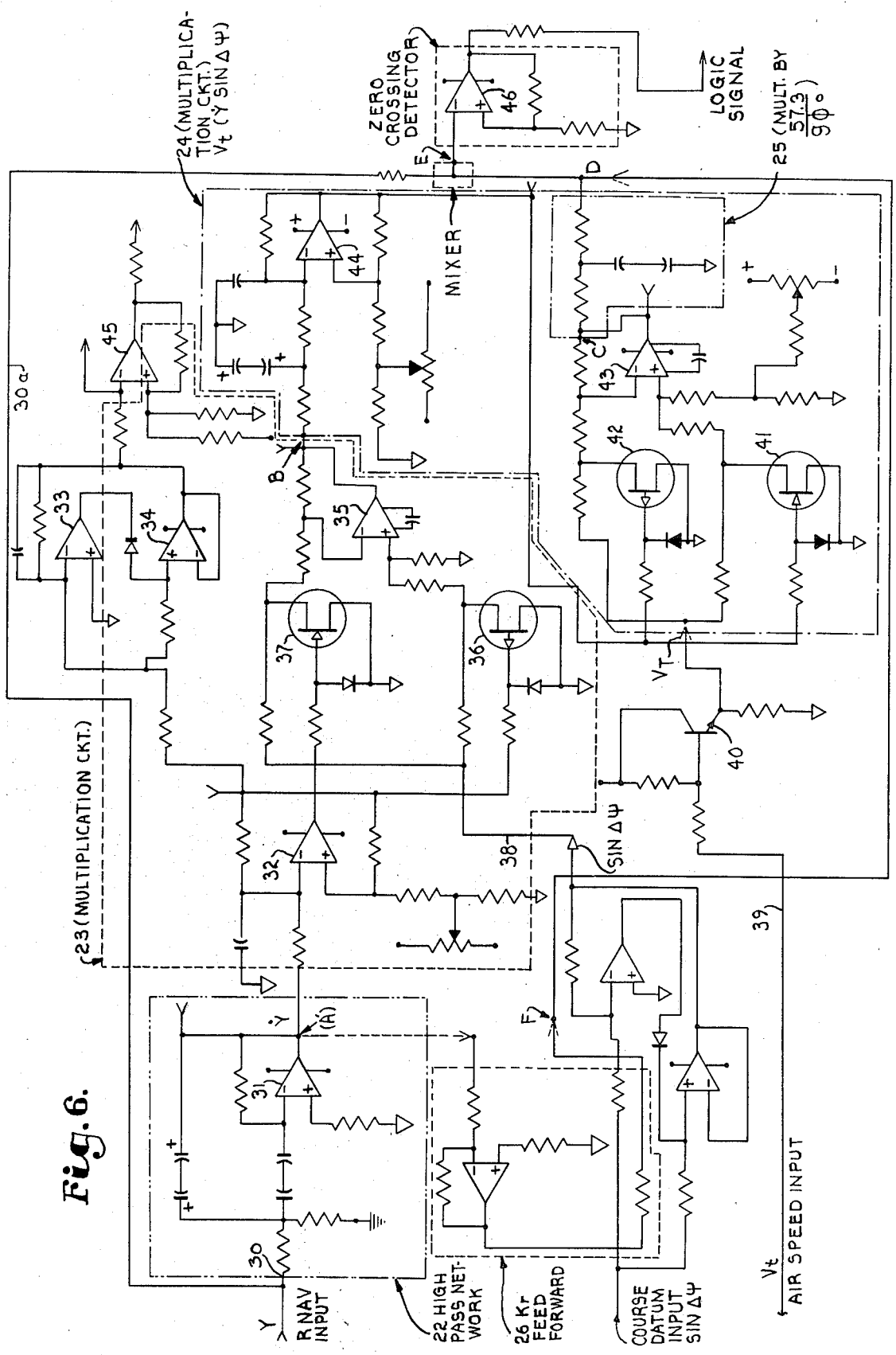
FIG. 6 is a more detailed schematic diagram of the circuit shown in FIG. 5.

Turning now more particularly to the method and apparatus that permits the computation of the maneuver initiation logic signal, it should be understood that same may be utilized with either a flight director or an autopilot. The basic problem is knowing when to initiate the required aircraft maneuvers so that the radio beam center is achieved when the aircraft heading is coincident with the radio course. It is further very desirable that the proper aircraft heading be acquired in a minimum amount of time with the least amount of steering. Accordingly, the subject method and apparatus operates to cause lateral beam capture in a minimum amount of time using a constant maximum bank angle.

The RNAV or VOR course intercept problem may be expressed mathematically and the following terms will be used in a later described intercept equation. Accordingly a definition of each term used in the equation will be given with some of the terms used therein specifically indicated in FIG. 1.

In the above mentioned equation, $Y$ is equal to the RNAV or VOR crosstrack distance in nautical miles. This is the distance that the aircraft is from the desired course and is usually a distance of between zero to 10 or 20 nautical miles. $\dot{Y}$ represents the aircraft crosstrack rate in nautical miles per second. The crosstrack aircraft rate can be computed by multiplying the aircraft speed times the sine of the angle between the desired RNAV radio course and the aircraft heading. $\ddot{Y}$ is a term used to represent the crosstrack acceleration and is the rate of change of the crosstrack rate. The aircraft will generally accelerate when it goes into a bank angle and a constant acceleration or deceleration will exist when the aircraft is at a constant bank angle. $\Delta \Psi$ is equal to the course datum heading and is usually expressed in degrees. The course datum is the angle that the aircraft heading makes with the desired area navigation radio course. $V_t$ corresponds to the aircraft speed in nautical miles per second. g is the acceleration of gravity expressed in nautical miles per second squared (N.M/sec$^2$). $\phi_o$ is the constant aircraft bank angle and corresponds to the bank angle of the aircraft when the intercept equation is solved.

From the above, the aircraft crosstrack rate $\dot{Y}$ can be expressed in terms of aircraft speed and the sine of the course datum angle e.g. $\dot{Y} = V_t \sin \Delta \Psi$. Stated another way, the crosstrack rate may be expressed as an approximation or $\dot{Y} \approx V_t \Delta\Psi/57.3$. In this instance, a small angle approximation is implemented since, for small angles, $\Delta \Psi$ is quite linear thereby permitting sine of $\Delta \Psi$ to be replaced with $\Delta\Psi$ over 57.3. Since $\dot{Y} = V_t \Delta\Psi/57.3$, then $\ddot{Y} = \dot{V_t} \Delta\Psi/57.3 + V_t \Delta\dot{\Psi}/57.3$. Inasmuch as both $\dot{V_t}$ and $\Delta\Psi$ are relatively small quantities, their product is extremely small and can be disregarded as being negligible in comparison with the first term in the equation. The crosstrack acceleration ($\ddot{Y}$) then approximately corresponds to $\ddot{Y} \approx V_t \Delta\dot{\Psi}/57.3$.

The heading rate $\Delta\dot{\Psi}$ relates to the aircraft bank angle in an approximate proportional term and may be expressed as being equal to the acceleration to the gravity ($g$) times the bank angle ($\phi_o$) divided by the velocity $V_t$, e.g. $\Delta\dot{\Psi} \approx g\phi_o/V_t$. It follows then that $\ddot{Y}$ approximately equals $g\phi_o/57.3$. The velocity $V_t$ in the numerator and the $V_t$ in the denominator cancel out so that the crosstrack acceleration may be indicated as follows:

$$\ddot{Y} = V/t \ g\phi_o/V/t \ (57.3) \approx g\phi_o/57.3$$

An equation can be written that relates aircraft position with respect to the RNAV course in terms of time (t);

$$Y(t) = 1/2 \ (g\phi_o/57.3) \ t^2 + \dot{Y}_o \ t + Y_o$$

The above is a quadratic equation in terms of time that can be solved to yield the solution for the intercept time or time to intercept the selected RNAV course given the quantities, Roll Angle ($\phi_o$); RNAV Rate ($\dot{Y}$); and RNAV Error ($Y$) Solving the above quadratic equation for t, the following is obtained.

$$t = -\dot{Y}_o \pm \sqrt{\dot{Y}_o^2 - 4 \ [(1/2)g \ \phi_o/57.3] \ Y_o}/[2 \ (1/2 \ g \ \phi_o/57.3)]$$

At this time it should be pointed out that the sub 0 terms (including $\dot{Y}_0$ and $Y_0$) relate to values of the respective variables that permit a solution to the above equation. The $Y$ and $\dot{Y}$ terms are measurable variables obtainable from the RNAV or conventional VOR receiving equipment. For example, $Y_0$ and $\dot{Y}_0$ are the crosstrack distance and crosstrack rate respectively, that give a single valued result to the above equation as it is solved for the value $t$ (time to achieve beam center).

In the above mentioned equation, the RNAV error ($Y$) is sensed by the area navigation receiver and is readily available for computation. The RNAV rate ($\dot{Y}$) is derived by using a high pass network which can derive rate from RNAV error. The high pass network is a filter providing some filtering action but primarily computes $\dot{Y}$, the rate information that is utilized in the circuit. The bank angle ($\phi_o$) is a preset angle that is known and constant. Accordingly, the above described equation is a quadratic equation in terms of time ($t$) that can be solved for time and which will typically have two roots or solutions. The correct solution will result in a particular time ($t$) of RNAV course intercept with no overshoot or undershoot. This solution is possible if the quantity under the square sign is equal to zero. If the term under the square root sign is negative, no solution exists. In such a case, the aircraft has already flown by the radio course and it is impossible to initiate a turn of less than 90° to capture the radio course.

FIG. 2 is an indication of the aircraft beginning its bank maneuver too soon and actually never intercepting the RNAV or VOR radio course. A more typical flight path is shown in FIG. 3 which graphically illustrates the potential difficulty with an aircraft becoming properly aligned on an RNAV or VOR course when it is attempting the lateral beam capture maneuver.

By referring to the intercept equation and solving for time, it is seen that if the discriminate (portion of the equation under the square root sign) is positive, two time solutions are possible (again note FIG. 3). The first root of the quadratic equation ($t_1$) would be equal to the time required to fly through the RNAV course from point A. However, when the aircraft flies through the radio course it is not properly lined up with same and therefore will continue to fly on beyond. The second solution corresponds to the location T2 and is the time that the aircraft requires to return and again fly through the desired radio course. As can be seen, this type of procedure could conceivably continue in a damped sine wave fashion until the aircraft was finally aligned and flying down the desired RNAV or VOR radio course.

If the discriminate is zero, the time to intercept becomes a desirable single valued solution. Such a situation indicating a desirable and typical profile of an aircraft utilizing subject method and apparatus is shown in FIG. 4. The aircraft starts its turn and is precisely lined up with the radio course at the end of the maneuver so that no further steering is necessary. The equation obtained from setting the discriminate to zero is as follows:

$$\dot{Y}_o^2 - 4 (1/2\ g\ \phi_o / 57.3)\ Y_o = 0$$
$$Y_o = [\dot{Y}_o^2\ (57.3)/2\ g\ \phi_o]$$

This equation states that the proper point to initiate the turn into the radio course is proportional to the square of the crosstrack rate and inversely proportional to the aircraft bank angle that the aircraft will assume during the turn onto the course.

Alternately the above equation may be expressed in the following manner:

$$\dot{Y}_o = V_t\ \mathrm{SIN}\ \Delta\ \Psi_o$$

Therefore:

$$Y_o = [\dot{Y}_o\ \mathrm{SIN}\ (\Delta\Psi_o)\ (57.3)V_t]/[2\ g\phi_o]$$

The block diagram shown in FIGS. 5 (and shown in detail as a schematic in FIG. 6) is specifically designed to compute the proper capture point and incorporates the unique features of the subject invention. A zero crossing at point E in FIG. 5 indicates that a solution has been achieved in the above equation for $Y_o$. The output of this logic block provides a logic signal to the autopilot that initiates proper capture maneuver consisting of a fixed bank angle command to the aircraft.

The RNAV computer indicated by the numeral 20 will compute the crosstrack error $Y$. Such a device is currently being marketed by the King Radio Corporation of Olathe, Kansas and is designated by both identification numbers KNC 610 and KN 74. With the representative signal appearing on lines 21a and 21b (FIG. 5) a high pass network 22 will provide the crosstrack rate from the crosstrack error and will have an output therefrom ($\dot{Y}$) at point A'. The crosstrack rate ($\dot{Y}$) is then multiplied by the course datum error ($\sin\Delta\Psi$). The output of the multiplication circuit 23 is shown at point B with this signal again being multiplied by the air speed $V_t$ in the circuit 24 and with the output thereof being shown at point C. Finally, the circuit 25 will multiply the signal at point C by the factor of $57.3/g\ \phi_o$ thereby having a processed output at point D of the circuit.

A feed forward or compensating circuit is indicated by the numeral 26 and operates to make up for or compensate for time delays that are generally inside the area navigation receiving equipment. For example, typical lags inside VOR receivers or area NAV receivers may vary from 3 seconds to 15 seconds. As a result of the information that is received being delayed, feed forward circuit 26 is needed to compensate for these delays by adding additional rate in a circuit.

The circuit shown in FIG. 6 is a more detailed version of the block diagram in FIG. 5 and performs the same functions described above.

The area NAV computer indicated by the numeral 20 (FIG. 5) is generally comprised of a receiver with some computation circuitry having an output which includes an analog voltage proportional to the deviation of a desired RNAV or VOR radio course. The maximum deviation of the receiver is typically 5 to 10 nautical miles with a 15 nautical mile deviation being represented by approximately 150 milivolts. This information from the area NAV computer is then fed into the high pass network 22 which functions to generate crosstrack rate. The high pass network will normally comprise a capacitor, a resistor, and an operational amplifier configuration common to most autopilots for generating rate information. This operational amplifier will include a series of resistor-capacitors coming into an amplifier summing junction with the amplifier having a fixed resistor feedback. This rate information coming from the high pass network 22 is expressed in nautical miles per second and corresponds to the crosstrack rate ($\dot{Y}$).

The above mentioned multiplication circuits 23, 24 and 25 operate as follows to further process the crosstrack rate information. For example, the block 23 multiplies the rate of the sine of the course datum angle (the angle that the aircraft makes with the radio course). The variable output is represented by a DC voltage with the multiplier using state-of-the-art multiplication based on pulse width. For example, one variable may be converted to a variable duty cycle pulse width or 50 percent duty cycle representing zero. The other variable (for example in this case $\dot{Y}$) chops the signal in proportion to the sine $\Delta\Psi$ magnitude. This effectively mechanizes the multiplication function. For example, if the $\Delta\Psi$ were zero, the other variable would be chopped 50 percent in the other direction and would end up a zero output. The next circuit block (24) includes a similar multiplication pulse width analog multiplier and multiplies the output of block 23 by the indicated air speed. This becomes important since the indicated air speed is an analog voltage and represents the true air speed on board the aircraft. The voltage representing air speed may vary from 0 to 15 volts and conveniently corresponds to air speed values of from zero to 450 knots. The mechanization of this multiplier is essentially the same as the one mentioned above. The output of the multiplier at this particular point C on the block diagram is fed through a summing resistor (or scaling resistor) that corresponds to the particular constant given in the above mentioned equation, mainly the 57.3° per radian conversion factor; the gravity g which is 32.2 feet per second squared; and the bank angle which in this case is 25°. Again, implementation is accomplished via a scaling resistor or a gain on an amplifier to complete the loop of the capture point circuit.

The feed forward term labelled $K_r$ and its output is shown in point F. All of these signals are summed together at the point E. This circuit may comprise an operational amplifier with a switching output that is suitable for driving a logic comparator or suitable for generating logic signals that would tell the autopilot when to start to initiate its capture maneuver.

The RNAV input Y is shown in FIG. 6 as being delivered to the high pass filter network 22 via line 30. This high pass network includes an operational amplifier generally represented by the numeral 31 which cooperates with the indicated resistors and capacitors to compute crosstrack rate ($\dot{Y}$) from the RNAV input Y (crosstrack error) at the output point A'. The output of block 22 (the highpass network) is then fed to the multiplication block 23. This multiplication block includes operational amplifiers 32, 33, 34, 35 and field effect transistors 36 and 37. These components are interconnected to perform an analog type multiplication using conventional pulse width techniques. A second input to the multiplication circuit 23 is shown on line 38 as the course datum (sin $\Delta\Psi$). Therefore, the output of circuit 23 at point B is the product of the crosstrack rate ($\dot{Y}$) times the course datum (sin $\Delta\Psi$).

A further multiplication is then achieved in circuit 24. The two inputs to circuit 24 include air speed ($V_t$) which appears on line 39 and the circuit product signal $\dot{Y}$ sin $\Delta\Psi$ coming in at point B. The first transistor 40 level shifts the velocity to an appropriate analog level so that it can be multiplied using similar techniques to those in multiplication circuit 23. Actually, the circuitry is identical to the circuitry used in multiplication block 23 and will include the field effect transistors 41 and 42 and operational amplifiers 43 and 44 and 45. The output of the velocity $V_t$ and the other variable $\dot{Y}$ SIN $\Delta\Psi$ is shown at point C and is fed through a resistor-capacitor network that filters the output and also scales same to include the conversion factor effect ($57.3/g\phi_o$). The output at D is then mixed with the crosstrack error on line 30a and the summed error signal is shown as point E on the diagram. The error signal at point E is fed to an operational amplifier 46 whose output is used to drive a logic signal that would initiate the maneuver command.

To zero crossing detector consists of a hysteresis type of operational amplifier that has two stable states with the changing of state represents a zero crossing. Typically, the crosstrack rate for a given intercept problem will be constant since the heading with respect to the course will be constant and therefor the voltage at point D will be a constant value while the aircraft is intercepting or approaching a given radio beam. The crosstrack error on lines 30 and 30a will be ddecreasing in a linear fashion. When the crosstrack voltage (on 30a) is equal and opposite the voltage value shown at point D, a zero crossing is detected and a logic signal produced that starts the capture maneuver when autopilots are used. Likewise, this signal would result in a command bar deviation on a flight director that would indicate to the pilot to initiate his constant bank turn such that be could make good the center of the radial.

It should be pointed out that the ability to compensate for the actual aircraft speed $V_t$ enables the minimum time radio course intercept and alignment to be accomplished. Also maximum bank angles may be used and longer durations of flight under the supervision of the air traffic controllers maintained. Since aircraft speed could vary so substantially, (from 100 to 450 nautical miles per hour) more sophisticated aircraft need to effect maximum bank angle and roll out onto the selected course commensurate the actual aircraft speed. The above described method and apparatus utilizes the actual aircraft speed for regulating and compensating the resultant logic signal thereby establishing a position and accurate control over the aircraft for lateral radio course intercept.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcominations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A system for controlling aircraft maneuvers to enable an aircraft to rapidly achieve a heading coincident with a radio defined course, said system comprising
    means for producing an electrical signal corresponding to the aircraft distance from said radio defined course,
    means for producing a crosstrack rate signal that is modified by course datum and a conversion factor which includes aircraft bank angle,
    means for producing an electrical signal corresponding to the variable velocity of said aircraft,
    circuit means for multiplying said modified crosstrack rate signal by said velocity signal and having a corresponding output signal, and
    means for comparing said output signal produced by said last mentioned means with said aircraft distance signal, said comparing means producing a logic signal when said output signal corresponds in a preselected manner with said distance signal, said logic signal being suitable to initiate a capture maneuver to thereby enable said aircraft to achieve a heading coincident with said radio defined course.

2. The combination as in claim 1 wherein said modified crosstrack rate signal producing means includes
    means for producing a signal corresponding to the sine of the course datum heading (SIN$\Delta\Psi$),
    means for producing a signal corresponding to the crosstrack rate ($\dot{Y}$), means for multiplying said crosstrack rate signal by said course datum heading signal, said multiplying means thereby producing a signal output corresponding to the equation $\dot{Y}$ SIN $\Delta\Psi$, said velocity signal multiplying means being operable to multiply said velocity signal by said signal corresponding to the equation $\dot{Y}$ SIN $\Delta\Psi$ and to thereby produce a signal which is represented by the equation $V_t \dot{Y}$ SIN$\Delta\Psi$, said last mentioned equation further modified by said conversion factor including aircraft bank angle prior to being compared with said aircraft distance signal.

3. The combination as in claim 2 wherein said crosstrack rate producing means includes a means for multiplying the signal represented to by the equation $V_t \dot{Y}$ SIN $\Delta\Psi$ by a conversion factor corresponding to the term of approximately $57.3/g\ \phi_o$ where $g$ is the accleration due to gravity and $\phi_o$ corresponds to the constant aircraft bank angle.

4. The combination as in claim 1 wherein said system includes means for compensating for time delays normally associated with VOR or area navigation receiving equipment.

5. The combination as in claim 4 wherein said compensating means includes a feed forward circuit, said feed forward circuit having an input corresponding to said crosstrack rate signal and an output, said output being delivered to said comparing means to thereby compensate for said time delays during the operation of said comparing means.

6. A method of controlling aircraft maneuvers thereby enabling an aircraft to rapidly achieve a heading course with a radio defined course, said method including the steps of producing an electrical signal corresponding to the arcraft distance of said ratio defined course, producing a crosstrack rate signal that is modified by course datum and a conversion factor which includes aircraft bank angle, porducing an electrical signal corresponding to the variable velocity of said aircraft, multiplying said modified crosstrack rate signal by said velocity signal to produce a corresponding output signal, and comparing said output signal produced by said last mentioned means with said aircraft distance signal, said comparing step producing a logic signal when said output signal correspnds in a preselected manner with said distance signal, said logic signal being related to a capture maneuver to enable said aircraft to achieve a heading substantially coincident with said radio defined course.

7. The combination as in claim 6 wherein said crosstrack rate signal producing step includes producing a signal corresponding to the sine of the course datum heading (SIN$\Delta\Psi$), producing a signal corresponding to the crosstrack rate ($\dot{Y}$), multiplying said crosstrack rate signal by said course datum heading signal, said multiplying step thereby producing a signal output corresponding to the equation $\dot{Y}$ SIN$\Delta\Psi$, said velocity signal multiplying step being operable to multiply said velocity signal by said signal corresponding to the equation $Y$ SIN $\Delta\Psi$ and to thereby produce a signal which is represented by the equation $V_t\ Y$ SIN $\Delta\Psi$, said last mentioned equation further modified by said conversion factor including aircraft bank angle prior to being compared with said aircraft distance signal.

8. The combination as in claim 7 wherein said crosstrack rate signal producing step includes the step of multiplying the signal represented by the equation $V_t\ \dot{Y}$ SIN $\Delta\Psi$ by the conversion factor corresponding to the term of approximately $57.3/g\ \phi_o$ where g is the acceleration due to gravity and $\phi_o$ corresponds to the constant aircraft bank angle.

9. The combination as in claim 8 including the step of compensating for time delays normally associated with VOR or area navigation receiving equipment.

10. The combination as in claim 6 including the step of compensating for time delays normally associated with VOR or area navigation receiving equipment.

* * * * *

UNITED STATES PATENT OFFICE
CERTIFICATE OF CORRECTION

Patent No. 3,814,911  Dated June 4, 1974

Inventor(s) James J. Lehfeldt

It is certified that error appears in the above-identified patent and that said Letters Patent are hereby corrected as shown below:

Col. 2 -- line 35 -- "8nique" should be --unique--.

Col. 2 -- line 46 -- "cpa" should be --cap--.

Col. 4 -- line 13 -- "$\Delta\Psi 157.3$" should be -- $\Delta\Psi/57.3$ --.

Col. 4 -- line 28 -- at end of equation "157.3" should be --/57.3--.

Col. 7 -- line 58 -- "To" should be --The--.

Col. 7 -- line 67 -- "ddecreasing" should be --decreasing--.

Col. 9 -- line 36 -- "arcraft" should be --aircraft--.

Col. 9 -- line 36 -- "ratio" should be --radio--.

Col. 9 -- line 40 -- "porducing" should be --producing--.

Col. 10 -- line 6 -- "correspnds" should be --corresponds--.

Signed and sealed this 24th day of September 1974.

(SEAL)
Attest:

McCOY M. GIBSON JR.
Attesting Officer

C. MARSHALL DANN
Commissioner of Patents